Figure 1:
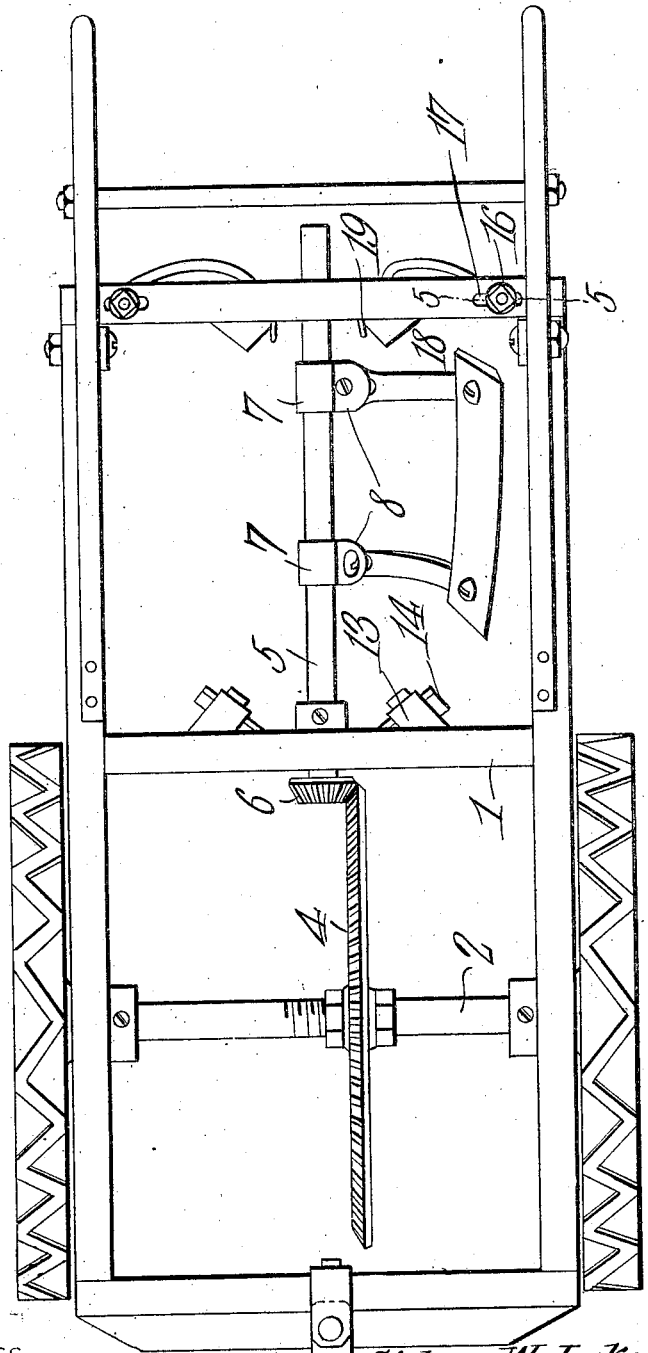

No. 878,066. PATENTED FEB. 4, 1908.
S. W. JACKSON.
COTTON CHOPPER.
APPLICATION FILED MAR. 9, 1907.

2 SHEETS—SHEET 1.

WITNESSES:

INVENTOR.
Sidney W. Jackson,
By
ATTORNEYS

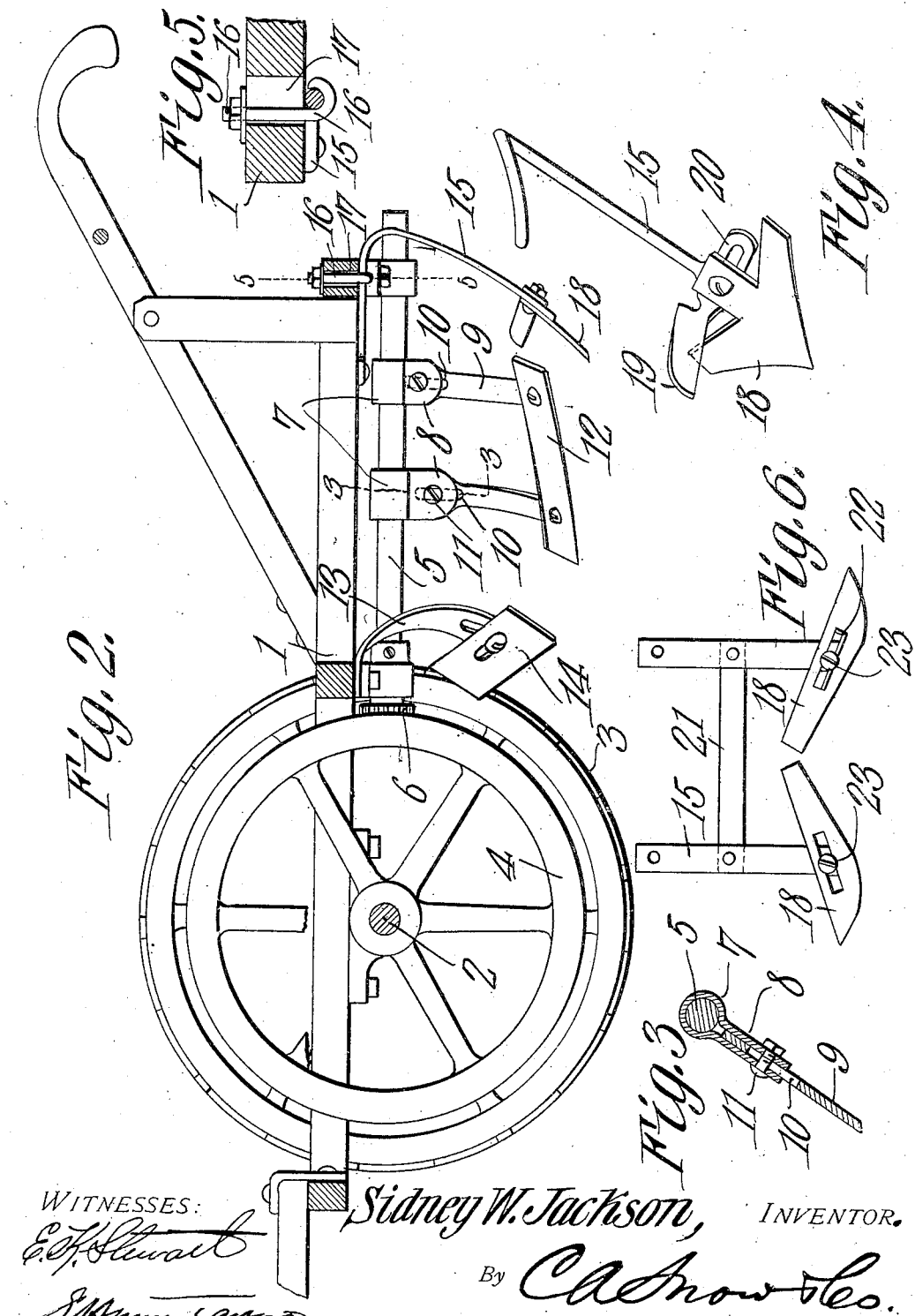

UNITED STATES PATENT OFFICE.

SIDNEY WARREN JACKSON, OF DILLON, SOUTH CAROLINA.

COTTON-CHOPPER.

No. 878,066.        Specification of Letters Patent.        Patented Feb. 4, 1908.

Application filed March 9, 1907. Serial No. 361,516.

*To all whom it may concern:*

Be it known that I, SIDNEY WARREN JACKSON, a citizen of the United States, residing at Dillon, in the county of Marion and State of South Carolina, have invented a new and useful Cotton-Chopper, of which the following is a specification.

This invention has relation to cotton choppers and it consists in the novel construction and arrangement of its parts as hereinafter shown and described.

The object of the invention is to provide a chopper having a shaft journaled longitudinally of the frame thereof and being provided with adjustable standards which carry a volute blade which rotates about the said shaft transversely of the frame. Adjustable trimming blades are located in advance of the said rotary blade and shovels are adjustably located behind the said rotary blade and are provided with laterally adjustable trimmers or fenders. Means is provided for adjusting the standards longitudinally of the staff in order that the rotary blade may be properly positioned between the trimming blades and the shovels.

In the accompanying drawings:—Figure 1 is a top plan view of the chopper. Fig. 2 is a longitudinal sectional view of the same. Fig. 3 is a transverse sectional view of the shaft and the cuff mounted thereon, said view being cut on the line 3—3 of Fig. 2. Fig. 4 is a perspective view of one of the shovels and its standard. Fig. 5 is a sectional view of a portion of frame of the chopper cut on the line 5—5 of Fig. 1, and Fig. 6 is a detail front elevation of a modified form of shovel and standard which may be used on the chopper.

The chopper consists of the frame 1 which is mounted upon the axle 2. The traction wheels 3 are attached to the ends of the said axle and the beveled gear wheel 4 is fixed to the said axle at an intermediate point thereof. The shaft 5 is journaled longitudinally of the frame 1 and is provided at its forward end with a beveled gear wheel 6 which meshes with the gear wheel 4. The cuffs 7 surround the shaft 5 and are provided with the depending spaced lugs 8. The upper ends of the standards 9 are provided with elongated perforations 10 through which the bolts 11 pass and the said bolts also pass through the lugs 8. By this means the standards 9 may be adjusted longitudinally with relation to the collars 7 and as the bolts 11 pass through the lugs 8 they form means for clamping the said collars into engagement with the shaft 5. Thus it is possible to shift the collars 7 longitudinally of the shaft 5.

The volute blade 12 is attached to the lower ends of the standards 9. The said standards 9 are curved laterally along their longitudinal axes and are also forwardly curved at their lower ends along their said axes. The curved standards 13 depend from the frame 1 in advance of the standards 9 and are provided at their lower ends with the trimming blades 14 which may be adjusted laterally and longitudinally along the standards 13. The standards 15 are pivoted at their upper ends to the frame 1 and the hooks 16 pass through elongated perforations 17 in the frame 1 and receive the upper portions of the standards 15. Thus as the said hooks are adjusted longitudinally along the opening 17 the standards 15 are brought toward each other or spread apart. The plow points 18 are attached to the lower end of the standards 15 and the vertically disposed fenders 19 are provided with the perforated elongated shanks 20 which are also attached to the lower end of the standards 15.

In the form of the invention as shown in Fig. 6 the standards 15 are connected together by a cross bar 21 and the plow points 18 are provided with elongated openings 22 which receive the securing bolts 23 that attach the said points to the standards 15 and thus means is provided for adjusting the said points upon the lower ends of the said standards.

From the foregoing description it is obvious that as the implement is drawn along a row of plants the blades 14 will trim the sides of the row and that the rotary blade 12 will move transversely across the row at intervals and remove the plants therefrom with a shearing cut. The shearing cut is effected by means of the volute configuration of the blade 12 and the peculiar disposition of the standards 9 upon which it is mounted. The plows 18 will throw the earth back along the sides of the row and the fenders 19 will protect the plants left standing from the earth that is thrown back toward them.

Having described my invention what I claim as new and desire to secure by Letters-Patent is:—

In a cotton chopper, a shaft journaled for rotation thereon, cuffs mounted upon the shaft and being capable of axial and longitudinal adjustment thereon, curved standards attached to the cuffs and a volute blade carried by the standards.

In testimony that I claim the foregoing as my own, I have hereto affixed my signature in the presence of two witnesses.

SIDNEY WARREN JACKSON.

Witnesses:
WILLIAM MURCHISON,
J. J. ALLEN.